(12) United States Patent
Loui et al.

(10) Patent No.: US 6,351,556 B1
(45) Date of Patent: Feb. 26, 2002

(54) METHOD FOR AUTOMATICALLY COMPARING CONTENT OF IMAGES FOR CLASSIFICATION INTO EVENTS

(75) Inventors: Alexander C. Loui, Penfield; Eric S. Pavie, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/197,363

(22) Filed: Nov. 20, 1998

(51) Int. Cl.$^7$ ................................................ G06K 9/34
(52) U.S. Cl. ....................................... 382/164; 382/168
(58) Field of Search ................................. 382/162, 163, 382/164, 165, 166, 167, 168, 169, 170, 171, 172, 305

(56) References Cited

U.S. PATENT DOCUMENTS

| | | |
|---|---|---|
| 4,396,903 A | 8/1983 | Habicht et al. ................ 382/9 |
| 5,083,860 A | 1/1992 | Miyatake et al. ........... 352/129 |
| 5,539,841 A | 7/1996 | Huttenlocher et al. ...... 382/218 |
| 5,594,807 A | 1/1997 | Liu ............................ 382/128 |
| 5,598,557 A | 1/1997 | Doner et al. ................. 395/605 |
| 5,719,643 A | 2/1998 | Nakajima .................... 348/700 |
| 5,748,771 A * | 5/1998 | Fujiwara ..................... 382/168 |
| 5,751,378 A | 5/1998 | Chen et al. ................. 348/700 |
| 5,805,746 A * | 9/1998 | Miyatake et al. ........... 382/305 |
| 5,809,202 A * | 9/1998 | Gotoh et al. .................. 386/69 |
| 6,021,231 A * | 2/2000 | Miyatake et al. ........... 382/305 |

* cited by examiner

Primary Examiner—Phuoc Tran
Assistant Examiner—Amir Alavi
(74) Attorney, Agent, or Firm—David M. Woods

(57) ABSTRACT

A method for comparing image content of first and second images, the method comprises the steps of extracting a portion of both the first and second images both of which portions are determined to include a main subject area of each image; dividing the main subject area of the images into a plurality of blocks; computing a color histogram for one block in each image; computing a histogram intersection value between the block of the first image and the block of the second image; and determining a first threshold value for the computed histogram intersection value that determines similarity between the block in the first image and the block in the second image.

18 Claims, 11 Drawing Sheets

METHOD FOR AUTOMATICALLY COMPARING CONTENT OF IMAGES FOR CLASSIFICATION INTO EVENTS

CROSS-REFERENCE TO RELATED APPLICATIONS

The present application is related to U.S. application Ser. No. 09/163,618, filed Sep. 30, 1998, by Alexander C. Loui and Eric S. Pavie, and entitled, "A METHOD FOR AUTOMATICALLY CLASSIFYING IMAGES INTO EVENTS".

FIELD OF THE INVENTION

The invention relates generally to the field of image processing having image understanding that automatically classifies pictures by events and the like and, more particularly, to such automatic classification of pictures by block-based analysis which selectively compares blocks of the images with each other.

BACKGROUND OF THE INVENTION

Pictorial images are often classified by the particular event, subject or the like for convenience of retrieving, reviewing, and albuming of the images. Typically, this has been achieved by manually segmenting the images, or by the below-described automated method. The automated method includes grouping by color, shape or texture of the images for partitioning the images into groups of similar image characteristics.

Although the presently known and utilized methods for partitioning images are satisfactory, there are drawbacks. The manual classification is obviously time consuming, and the automated process, although theoretically classifying the images into events, is susceptible to miss-classification due to the inherent inaccuracies involved with classification by color, shape or texture.

Consequently, a need exists for overcoming the above-described drawbacks.

SUMMARY OF THE INVENTION

The present invention is directed to overcoming one or more of the problems set forth above. Briefly summarized, according to one aspect of the present invention, the invention resides in a method for comparing image content of first and second images, the method comprising the steps of: (a) extracting a portion of both the first and second images both of which portions are determined to include a main subject area of each image; (b) dividing the main subject area of the images into a plurality of blocks; (c) computing a color histogram for one block in each image; (d) computing a histogram intersection value between the block of the first image and the block of the second image; and (e) determining a first threshold value for the computed histogram intersection value that determines similarity between the block in the first image and the block in the second image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of improved classification of images by utilizing block-based comparison that checks for similarity between two images, and for near-duplicate images.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In addition, the term "event" is defined herein as a significant occurrence or happening as perceived by the subjective intent of the user of the image capture device.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning).

Figure 1:
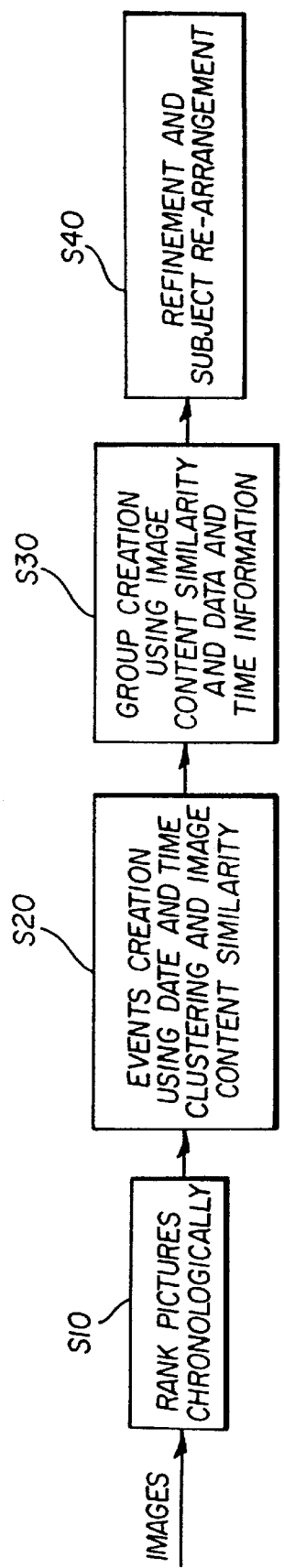
FIG. 1 is a block diagram illustrating an overview of the present invention.

Referring to now FIG. 1, there is illustrated a flow diagram illustrating an overview of the present invention. Digitized images are input into the computer system where a software program of the present invention will classify them into distinct categories. The images will first be ranked S10 in chronological order by analyzing the time and date of capture of each image. The date and/or time of capture of each picture may be extracted, for example, from the encoded information on the film strip of the Advanced Photo System (APS) images, or from information available from some digital cameras. The representations of the images will then be placed S20 into one of a plurality of distinct events by a date and time clustering analysis that is described below. Within each event, the contents of the images are analyzed S20 for determining whether images closest in time to an adjacent event should be maintained in the event as defined by the clustering analysis, or the adjacent events merged together. After the images are defined into events, a further sub-classification (grouping) within each event is performed. In this regard, the images within each event will then be analyzed by content S30 for grouping images of similar content together, and then the date and time S30 for further refining the grouping.

The event segmentation S20 using the date and time information is by a k-means clustering technique, as will be described in detail below, which groups the images into events or segments. A boundary check is then performed on the segments S20 for verifying that the boundary images should actually be grouped into the segment identified by the clustering, as will also be described below.

These groups of images are then sent to a block-based histogram correlator S30 for analyzing the content. For each event or segment sent to the correlator, a content or subject grouping S30 is performed thereon for further sub-classifying the images by subject within the particular event segment. For example, within one event, several different subjects may appear, and these subject groupings define these particular subjects. The subject grouping is based primarily on image content, which is performed by a block-based histogram correlation technique. This correlation compares portions of two images with each other, as will also be described in detail below. The result of the ranking is the classification of images of each segment into distinct subject groupings. The date and time of all the images within each subject grouping are then compared to check whether any two or more subject grouping can be merged into a single subject grouping S30.

A refinement and subject re-arrangement analysis S40 will further improve the overall classification and the subject grouping by rearranging certain images within a subject group.

Figure 2:
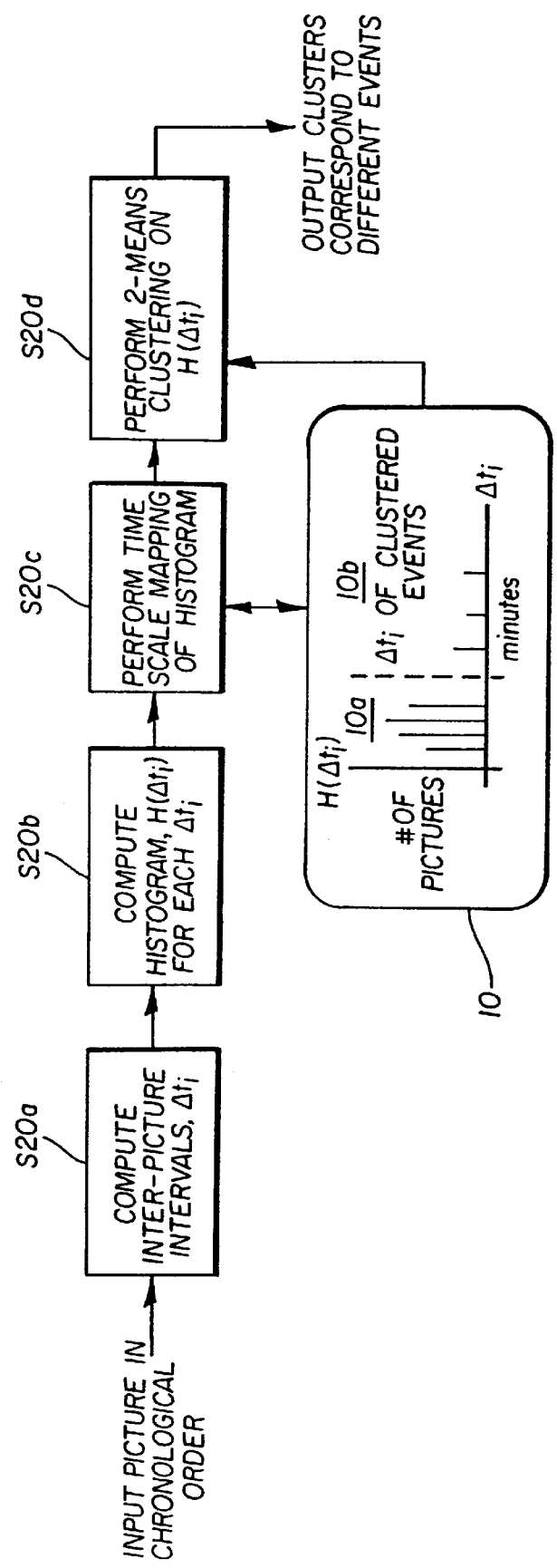
FIG. 2 is a block diagram illustrating a date and time clustering technique of the present invention.
Figure 3:
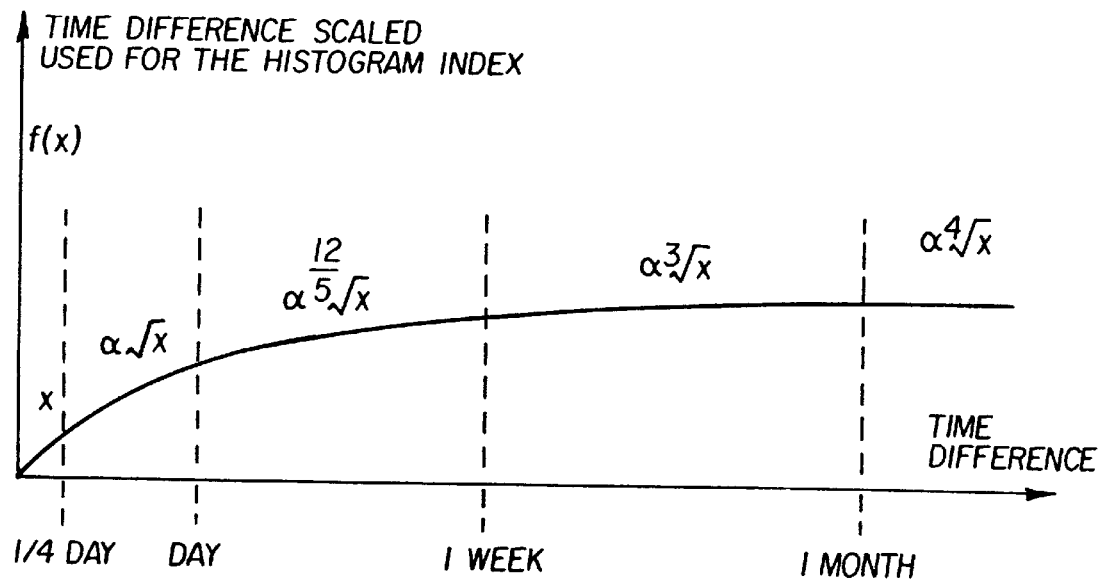
FIG. 3 is a graph illustrating a scaling function used to map the result of the 2-means clustering.

Referring to FIG. 2, there is shown an exploded block diagram illustrating the data and time clustering technique S20. First, the time interval between adjacent pictures (time difference) is computed S20a. A histogram of the time differences is then computed S20b, an example of which is shown in block 10. The abscissa of the histogram is preferably the time in minutes, and the ordinate of the histogram is the number of pictures having the specified time difference. The histogram is then mapped S20c to a scaled histogram using a time difference scaling function, which is shown in FIG. 3. This mapping is to take the pictures with small time difference and substantially maintain its time difference, and to take pictures with a large time difference and compress their time difference.

Figure 4:
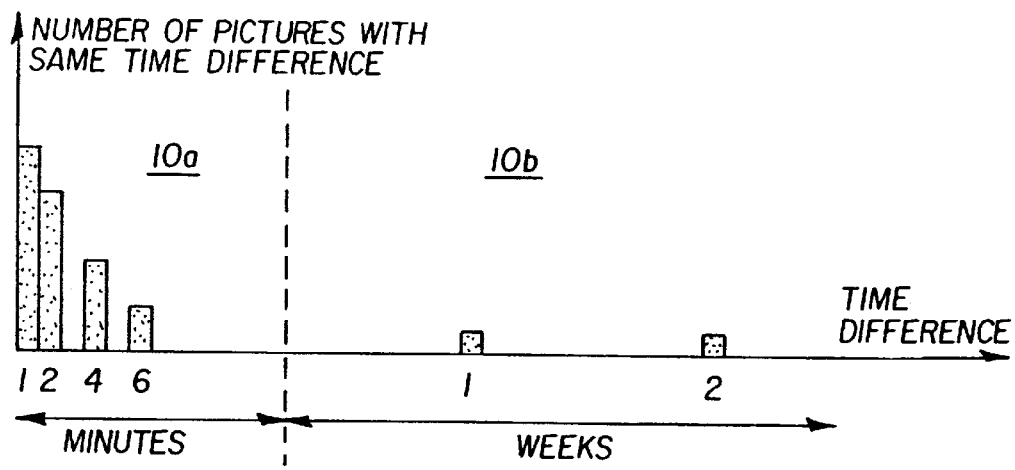
FIG. 4 is a graph illustrating a typical result of the scaling function of FIG. 3.

A 2-means clustering is then performed S20d on the mapped time-difference histogram for separating the mapped histogram 10 into two clusters based on the time difference; the dashed line represents the separation point for the two clusters. For further details of 2-means clustering, Introduction to Statistical Pattern Recognition, $2^{nd}$ edition by Keinosuke Fukunaga 1990 may be consulted, and therefore, the process of 2-means clustering will not be discussed in detail herein. Referring briefly to FIG. 4, the result of 2-means clustering is the segmentation of the histogram into two portions 10a and 10b. Normally, events are separated by large time differences. The 2-means clustering, therefore, is to define where these large time differences actually exist. In this regard, the right portion 10b of the 2-means clustering output defines the large time differences that correspond to the event boundaries.

Figure 5:
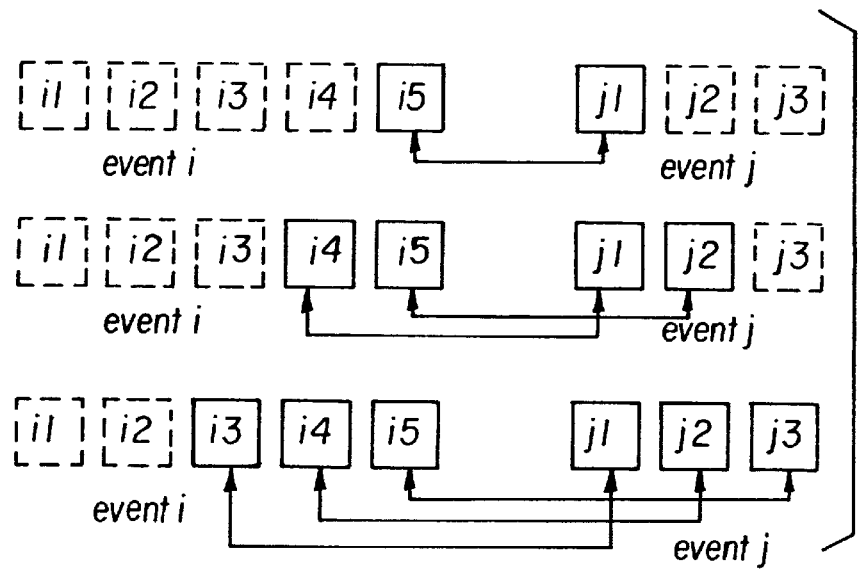
FIG. 5 is a diagram illustrating a block diagram of an event boundary checking after the date and time clustering.

Referring to FIG. 5, there is illustrated an example of boundary checking between events. For two consecutive events i and j, a plurality of block-based, histogram comparisons are made to check if the pictures at the border of one event are different from the pictures at the border of the other event. If the comparison of content is similar, the two segments are merged into one segment. Otherwise, the segments are not merged. Preferably, the comparisons are performed on the three border images of each event (i3, i4, i5 with j1, j2, j3), as illustrated in the drawing. For example, image i5 is compared with image j1 and etc. This block-based histogram comparison technique will be described in detail hereinbelow.

Figure 6:
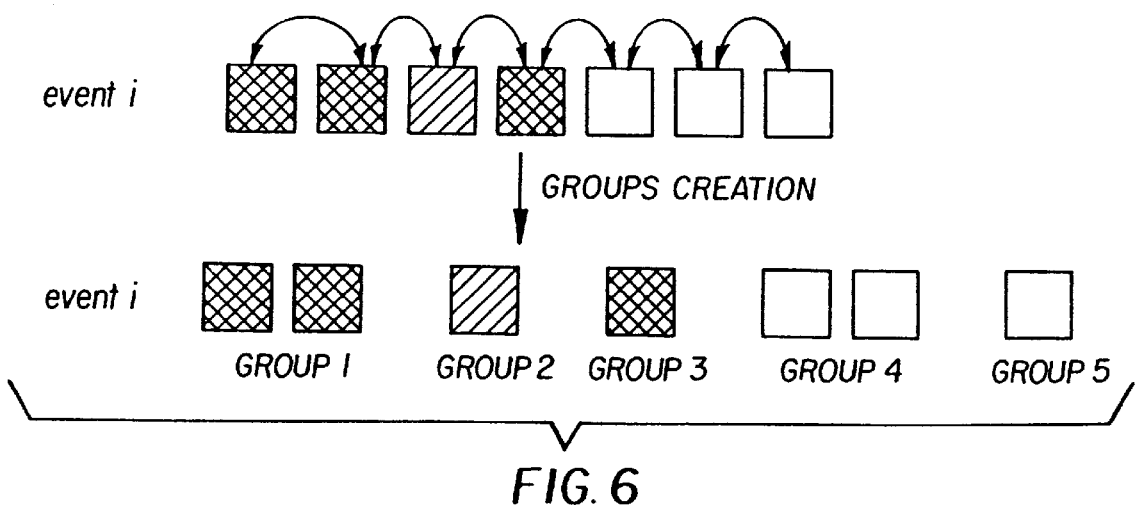
FIG. 6 is a diagram illustrating grouping of images within each event based on content.

Referring to FIG. 6, there is illustrated an overview of subject (content) grouping for each segmented event. Within each segmented event i, adjacent pictures are compared (as illustrated by the arrows) with each other using the below-described, block-based histogram technique. For example, the block-based histogram technique may produce five subject groupings (for example groups 1–5) from the one event i, as illustrated in the drawing. The arrangement of the subject grouping is stored for future retrieval during the subject arrangement step S40. In particular, the subject grouping having a single image is stored (for example, groups 2, 3, and 5).

Figure 7:
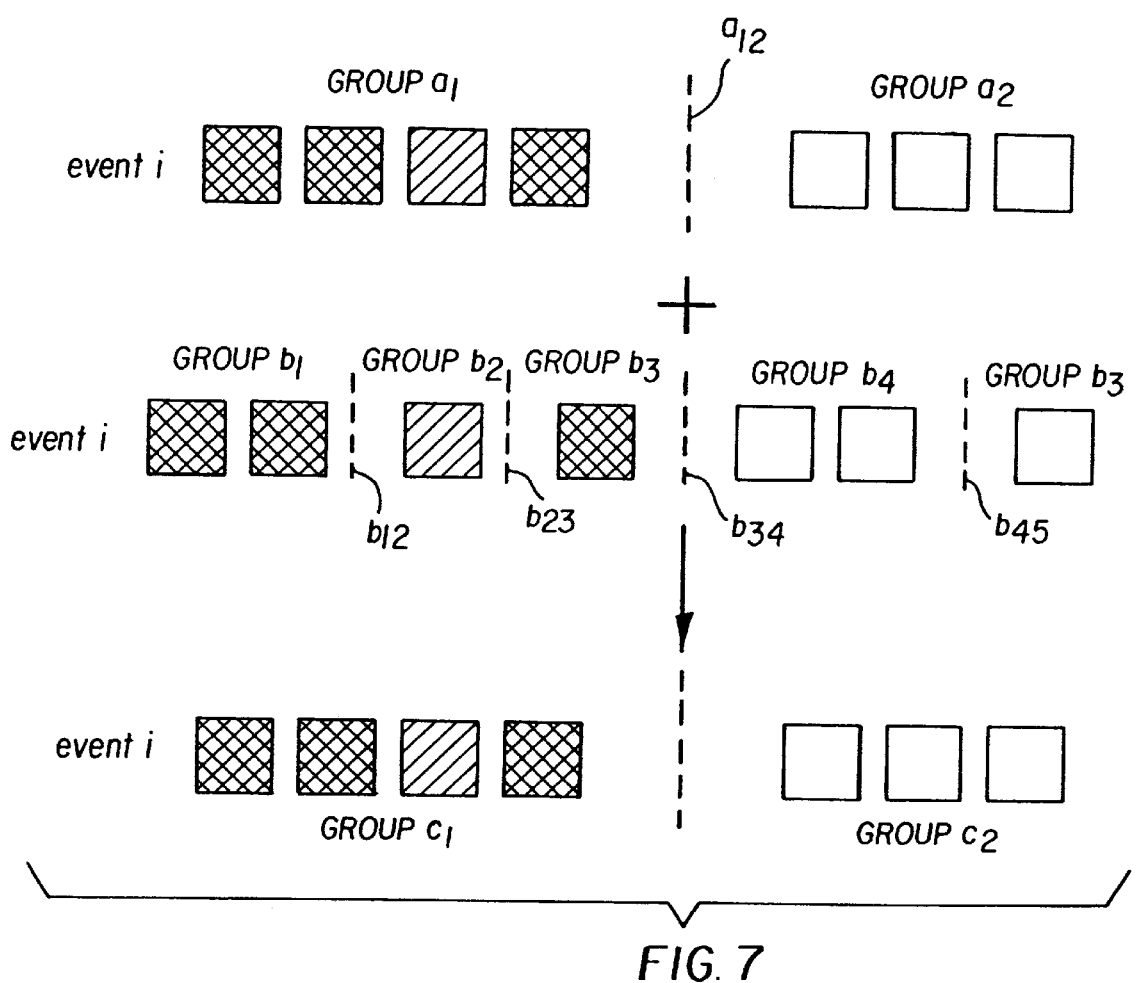
FIG. 7 is a block diagram of a group-merging step of the present invention.

Referring to FIG. 7, after the grouping by content, a time and date ordering is performed on the groupings for merging groups together based on a time and date analysis. A histogram of the time difference between adjacent images in the event is computed, similar to FIG. 4. A predetermined number of the largest time differences (for example boundary $a_{12}$) are compared with the boundaries (for example boundaries $b_{12}$, $b_{23}$, $b_{34}$, $b_{45}$) of the subject grouping determined by the block-based analysis. The predetermined number of largest time differences are determined by dividing the total number of images within an event by the average number of picture per group (four is used in the present invention). If the boundary of the subject grouping matches the boundary based on the chosen time differences, the subject groupings will not be merged. If there is not a match between the two boundaries, the subject groupings having a boundary not having a matched time difference in the histogram will be merged into a single subject grouping (for example groups $b_1$, $b_2$, $b_3$ merged into resulting group $c_1$).

Figure 8:
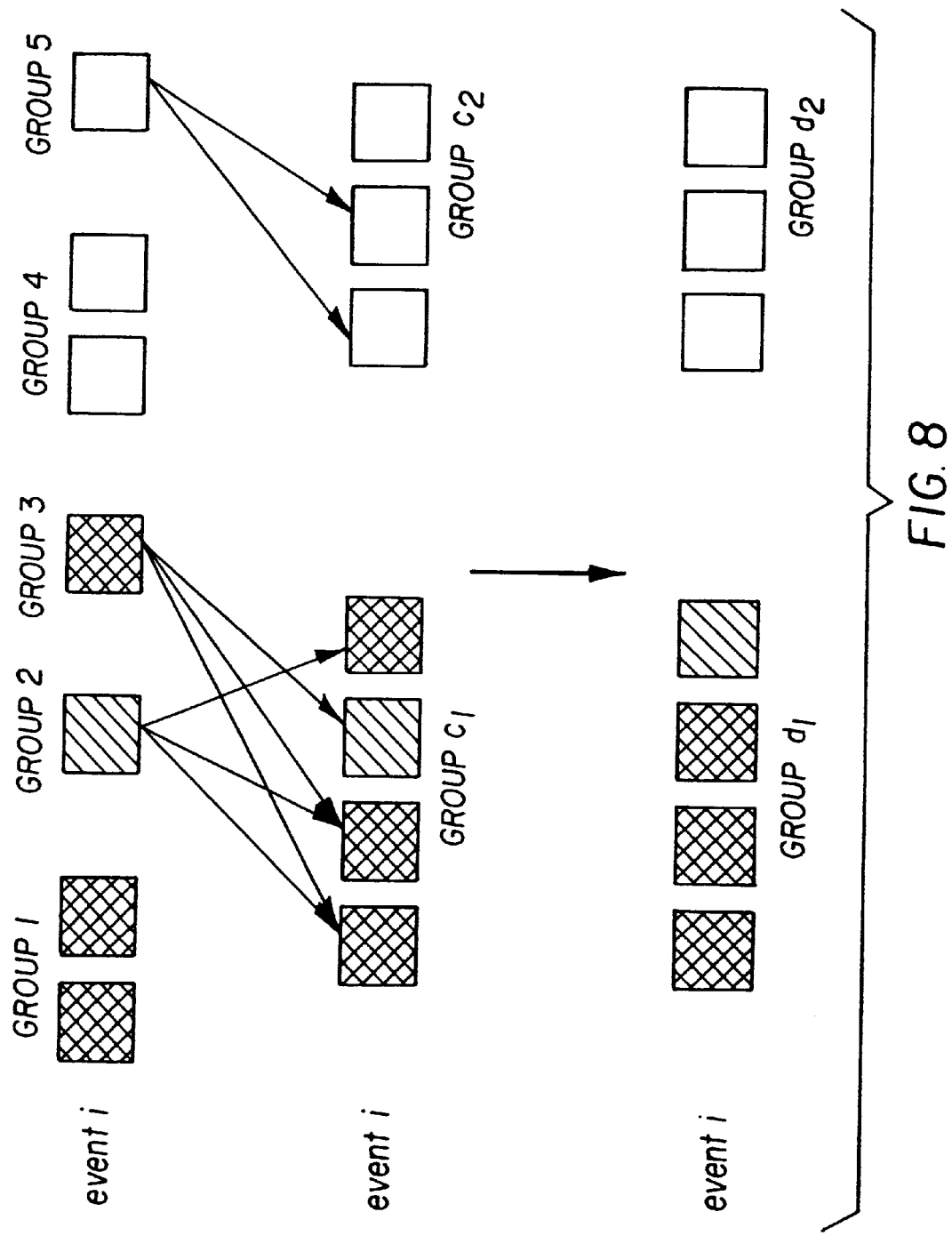
FIG. 8 is a block diagram of image re-arrangement within each group.

Referring to FIG. 8, there is illustrated a diagram of image re-arrangement within each group. The arrangement of the initial subject groupings is retrieved for identifying subject groupings that contain single images (for example the groups with a single image of FIG. 6 -groups 2, 3, and 5 that are re-illustrated as groups 2, 3, and 5 in FIG. 8). Any single images from the same subject grouping that are merged as identified by the merged subject grouping (for example, groups $c_1$ and $c_2$ of FIG. 7) are compared with all other images in the merged subject grouping, as illustrated by the arrows. This comparison is based on block-based histogram analysis. If the comparisons are similar, these images will be re-arranged so that the similar images are located adjacent each other, for example groups $d_1$ and $d_2$.

Further refinement is done by comparing any group that still contains a single image after the above procedure, with all the images in the event. This is to check if these single image groups can be better arranged within the event grouping. This comparison is similar to the subject re-arrangement step of FIG. 8.

Figure 9A:
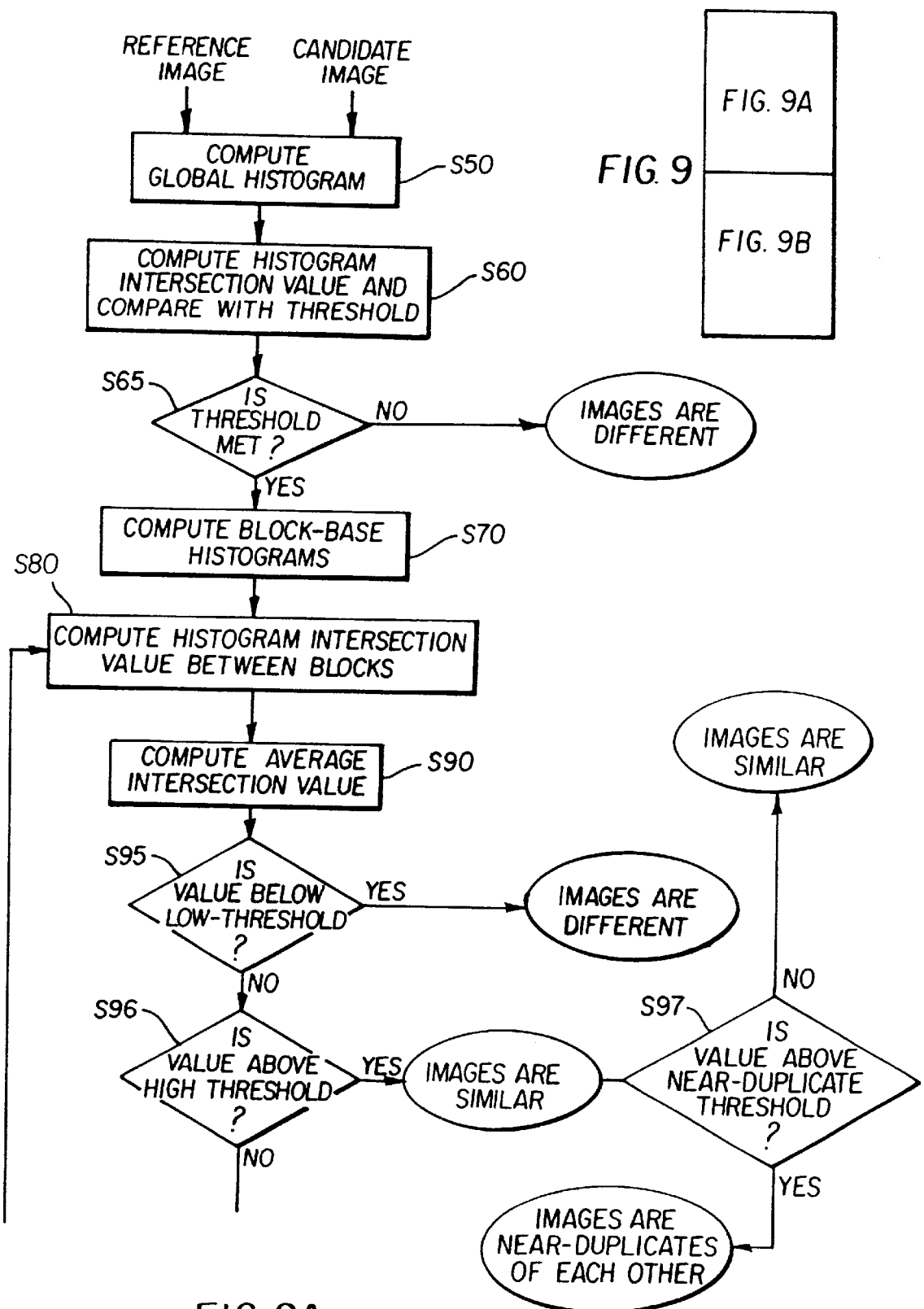
FIG. 9 is a flowchart of block-based histogram correlation technique.
Figure 9B:
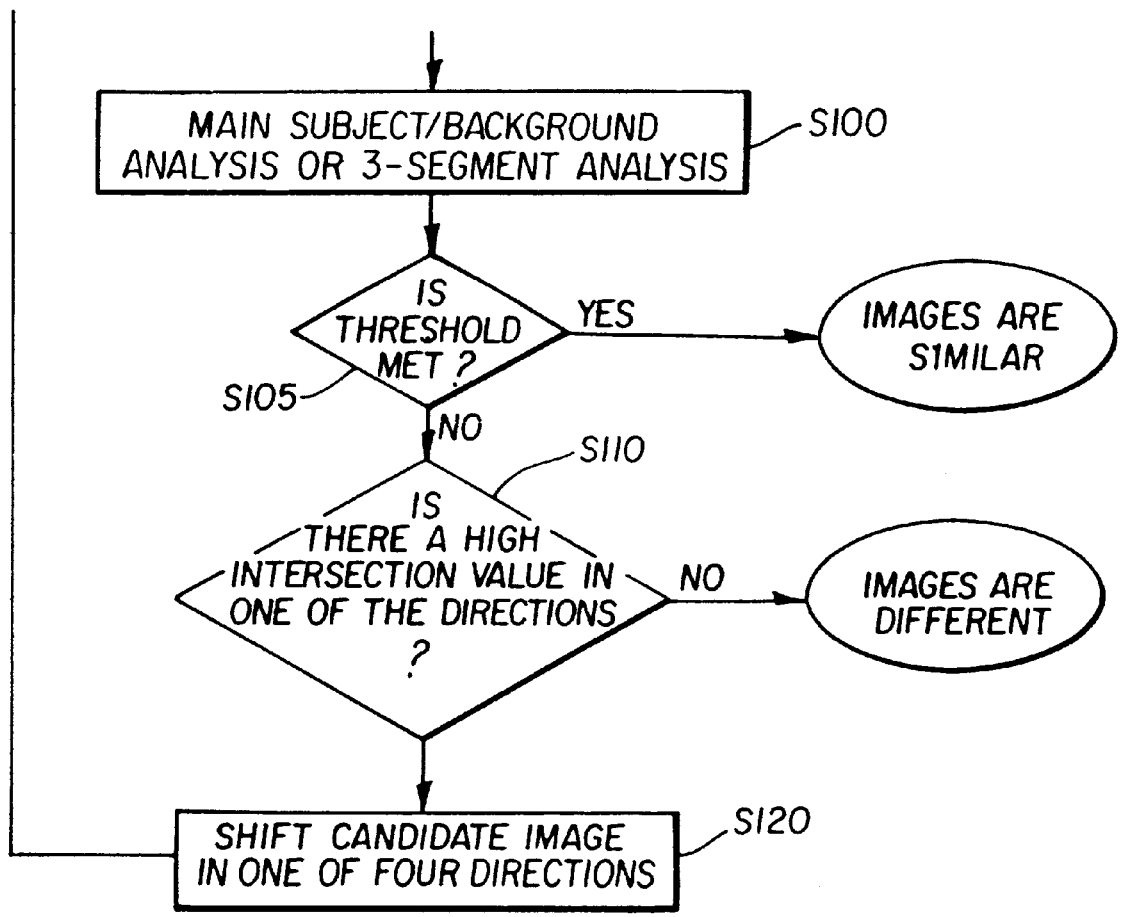
Figure 10:
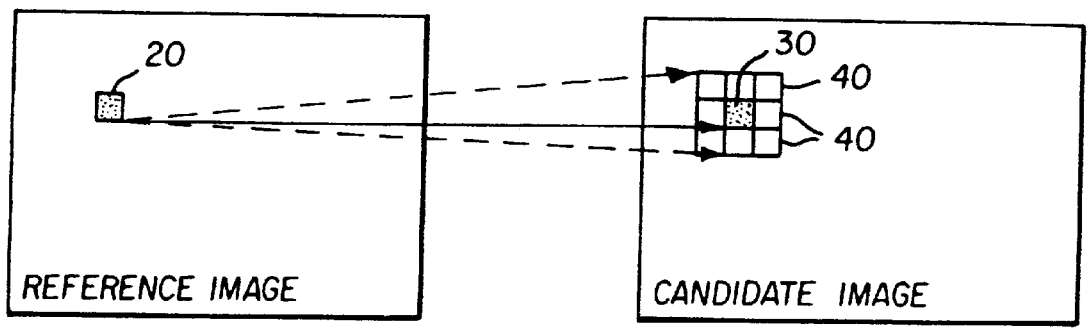
FIG. 10 is diagram illustrating the comparison between block histogram.

Referring to FIG. 9, there is illustrated a flowchart of the block-based histogram correlation used in the above analyses. First, a histogram of the entire image of both images is computed S50, a global histogram. A comparison of the two histograms is performed by histogram intersection value S60 illustrated the following equation:

$$Inter(R, C) = \frac{\sum_{i=1}^{n} \min(R_i, C_i)}{\sum_{i=1}^{n} R_i},$$  Eq. 1 where R is the histogram of the reference image, C is the histogram of the candidate image, and n is the number of bins in the histogram. If the intersection is under a threshold S65, preferably 0.34, although other thresholds may be used, the images are different. If the threshold is met or exceeded S65, then a block-based histogram correlation will be performed S70. In this regard, each image will be divided into blocks of a given size, preferably 32×32 pixels in the present invention. It is instructive to note that those skilled in the art may vary the block size depending on the resolution of the image without departing from the scope of the invention. For each block, a color histogram is computed. Referring to FIG. 10, if one image is considered a reference image and one image a candidate image, the images are compared in the following way. Each block 20 of the reference image is compared to the corresponding block 30 of the candidate image and to the adjacent blocks 40, 8 blocks in the present invention.

Referring to FIG. 9, the block histograms between the reference image and the candidate image are compared using the histogram intersection equation defined above S80. The average intersection value is derived by computing the average of the best intersection values from each of the block comparisons S90. This average intersection value will be compared to a low threshold (preferably 0.355), and a high threshold (preferably 0.557). If the average intersection value is below the low threshold S95, the two images are considered different. If the average intersection value is above the high threshold S96, then the two images are considered similar. If the average intersection value higher than the near duplicate threshold S97, preferably 0.75, then the images are considered near duplicates. It is instructive to note that near duplicates are significant because it permits the user to select the best of the two images to use in the albuming process.

If the average intersection value is between these two thresholds, further analysis will be performed as described below (main subject/background analysis or the 3-segment average intersection analysis S100).

Figure 11:
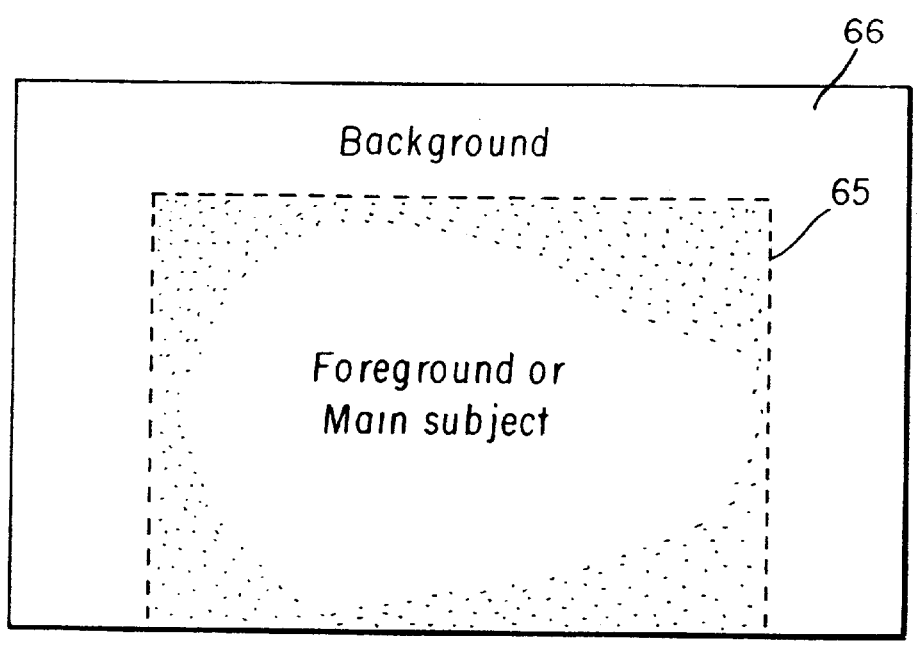
FIG. 11 is a diagram illustrating the extraction of the main subject.

Referring to FIGS. 9 and 11, in some instances, it is desirable to see if the foreground or main subject 65 are similar between two images even though the backgrounds 66 are different. For example, there may be two pictures of your dog in two different places, but it will be desirable to group them together because they are the same subject. The images are divided into two parts, a background 66 and foreground 65 as shown in FIG. 11. The corresponding parts are then compared between the two images to see if there is any similarity between the two main subject areas by using the histogram intersection value of Equation 1. The average of this histogram intersection value from the block comparison will be compared with a threshold. If the average value is greater than the threshold, preferably 0.5, than the two main subjects are considered similar. It is instructive to note that any well-known algorithm may be used to extract the main subject area for comparison, in lieu of the above described method. Such alternative embodiments are within the intended scope of this invention.

Figure 12:
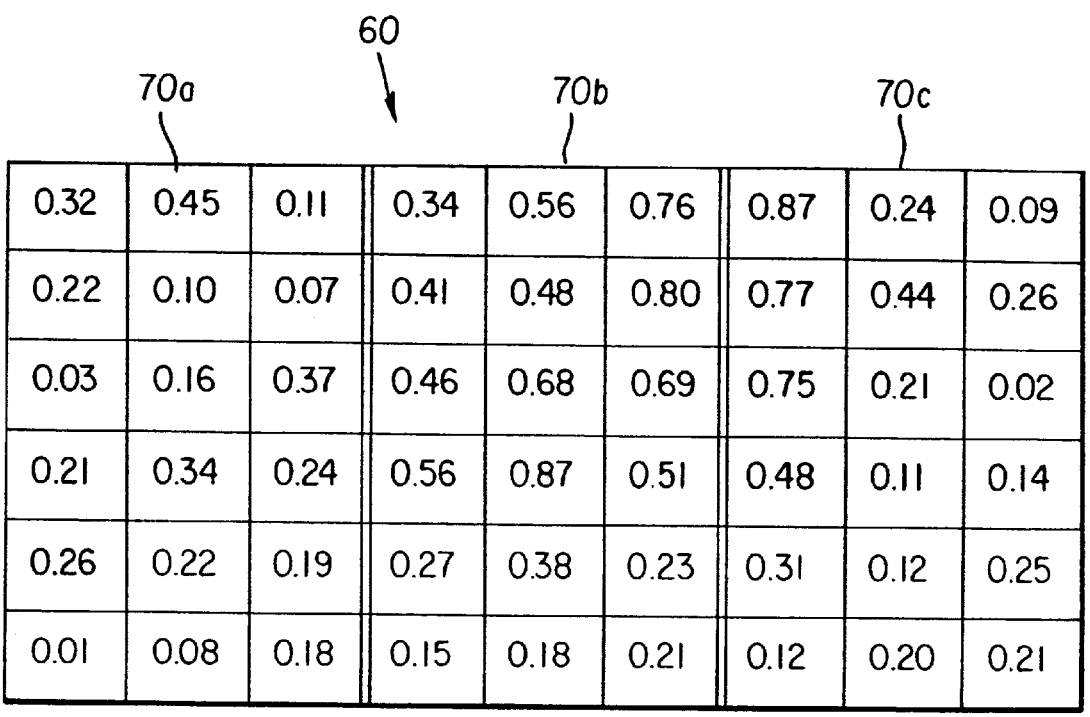
FIG. 12 is diagram of an example of best intersection mapping for three segment analysis.

In an alternative embodiment, and referring to both FIGS. 9 and 12, another method for performing 3-segment analysis to determine if the two images may contain a similar subject is shown. In this regard, this is performed by first forming a map 60 which contains the average of the two highest intersection values of each of the block comparisons; for example, 9 comparisons were performed in the illustration of FIG. 10, the average of the highest two will be used for map 60. FIG. 12 illustrates, for example, a 9×6 block although it should be understood that the map size depends on the size of the image. This map is divided into three parts: the left portion 70a, the center portion 70b, and the right portion 70c. If the average intersection value of the center portion 70b is higher than a threshold (preferably 0.38) S105, the two images may contain a very similar subject in the center portion 70b of the image, and the two images may be considered to be similar by subject. In addition, the comparisons of the histogram will be performed with the reference and candidate images reversed. If the two images are similar both methods should give substantially similar correlation; obviously if they are different, the results will not be similar. The images are then checked S110 to determine if there is a high intersection value in one of the directions, right, left, up, and down.

Figure 13:
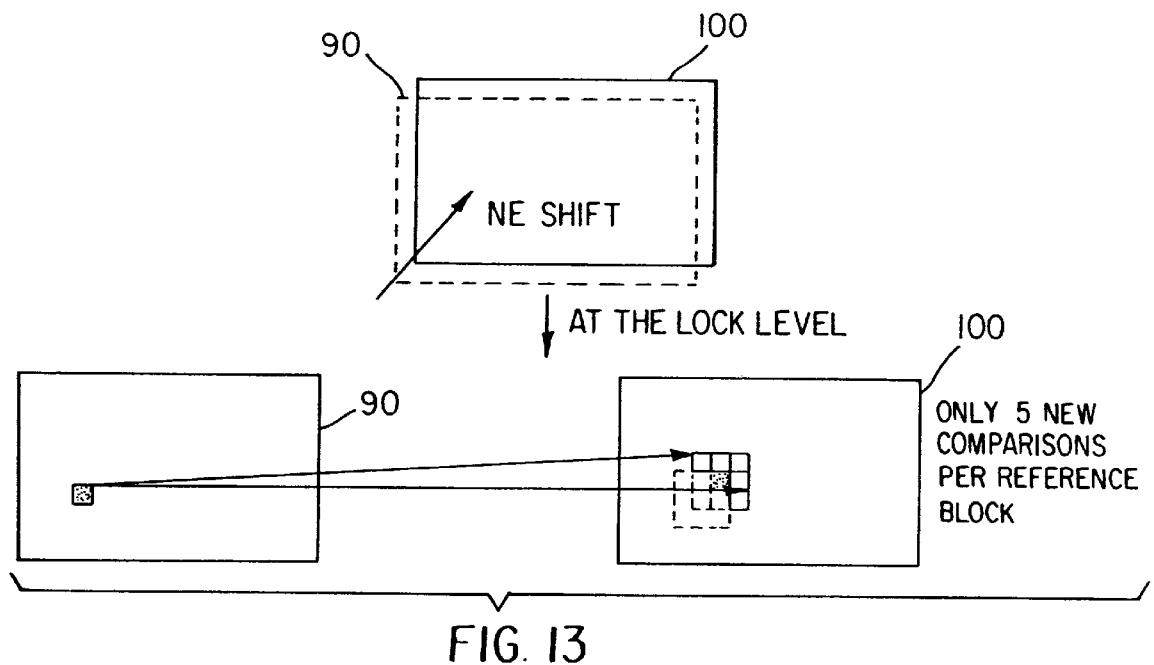
FIG. 13 is an illustration of shift detection within the block based histogram correlation.
Figure 14:
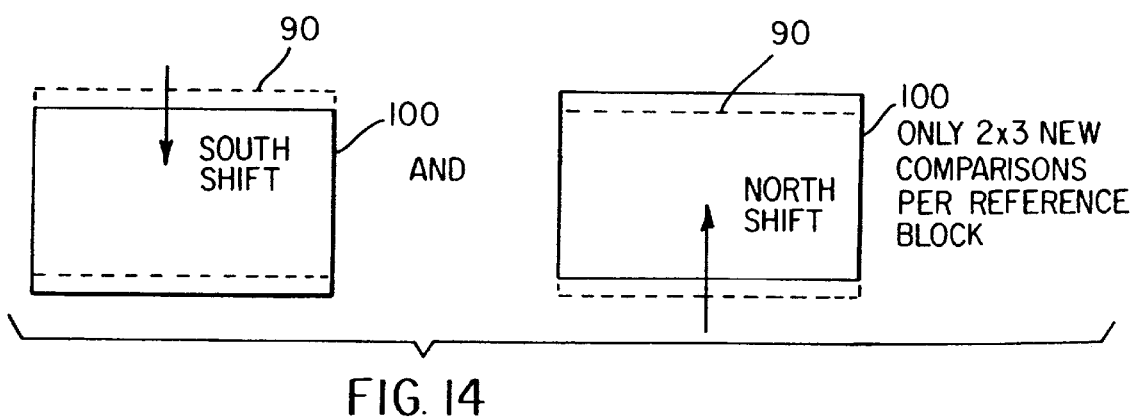
FIG. 14 is also an illustration of shift detection within the block based histogram correlation.

Referring to FIGS. 9, 13 and 14, shift detection is used to determine the case when the two images 90 and 100 have very similar subject that appears in different locations of the image. For example, the main subject may be situated in the center of one image and to the left-hand side of the other image. Such a shift can be determined by recording both the best intersection values of the reference blocks, as well as the coordinates of the corresponding candidate blocks. For each block of the reference image, nine block to block comparisons are made, the two best intersection values and the directions associated with the two best intersection values are used for determining the shift direction. The shift is performed on any combination of four basic directions, north, east, south and west. There are two cases which should be noted for clarity: either the directions are opposite (example N and S) or adjacent (example N and W). If the two directions are adjacent, a one-block shift (of the overall candidate image) in the combined direction, for example one north and one east gives a shift in the NE direction, as illustrated in FIG. 13. On the other hand if the directions are opposite, two one-block shifts, one in each direction, are performed, as illustrated in FIG. 14 The above analysis and the shift can be repeated S120 to check for similarity.

The invention has been described with reference to a preferred embodiment. However, it will be appreciated that variations and modifications can be effected by a person of ordinary skill in the art without departing from the scope of the invention.

What is claimed is:

1. A method for comparing image content of first and second images, the method comprising the steps of:
   (a) extracting a portion of both the first and second images both of which portions are determined to include a main subject area of each image;
   (b) dividing the main subject area of the images into a plurality of blocks;

(c) computing a color histogram for one block in each image;

(d) computing a histogram intersection value between the block of the first image and the block of the second image;

(e) determining a first threshold value for the computed histogram intersection value that determines similarity between the block in the first image and the block in the second image; and (f) shifting the first image in a predetermined direction if there is not a similarity between the first and second images and redetermining the similarity between the images in step (c)–(e) for blocks that are shifted with respect to each other.

2. The method as in claim 1, wherein step (c) includes (c1) computing a color histogram for each of the plurality of blocks, and step (d) includes (d1) computing a histogram intersection value between one block in the first image and a plurality of blocks in the second image.

3. The method as in claim 2 further comprising repeating step (d1) if there is not similarity between the first and second images.

4. The method as in claim 1, wherein step (a) includes dividing both of the images into three portions and using a middle portion of the three portions as the main subject area.

5. The method as in claim 1 further comprising the step of determining a second threshold value for the computed histogram intersection value that determines similarity between the block in the first image and the block in the second image and consequently if the two images are near-duplicates of each other.

6. A computer program product for comparing image content of first and second images comprising: a computer readable storage medium having a computer program stored thereon for performing the steps of:

(a) extracting a portion of both the first and second images both of which portions are determined to include a main subject of each image;

(b) dividing the main subject of the images into a plurality of blocks;

(c) computing a color histogram for one block in each image;

(d) computing a histogram intersection value between the block of the first image and the block of the second image;

(e) determining a threshold value for the computed histogram intersection value that determines similarity between the block in the first image and the block in the second image; and (f) shifting the first image in a predetermined direction if there is not a similarity between the first and second images and redetermining the similarity between the images in step (c)–(e) for blocks that are shifted with respect to each other.

7. The computer program product as in claim 6, wherein step (c) includes (c1) computing a color histogram for each of the plurality of blocks, and step (d) includes (d1) computing a histogram intersection value between one block in the first image and a plurality of blocks in the second image.

8. The computer program product as in claim 7 further comprising repeating step (d1) if there is not similarity between the fist and second images.

9. The computer program product as in claim 8, wherein step (a) includes dividing both of the images into three portions and using a middle portion of the three portions as the main subject area.

10. The computer program product as in claim 6 further comprising the step of determining a second threshold value for the computed histogram intersection value that determines similarity between the block in the first image and the block in the second image and consequently if the two images are near-duplicates of each other.

11. A method for comparing image content of first and second images, the method comprising the steps of:

(a) extracting a portion of both the first and second images both of which portions are determined to include a main subject area of each image;

(b) dividing the main subject area of the images into a plurality of blocks;

(c) computing a color histogram for each of the plurality of blocks in each image;

(d) computing a histogram intersection value between one block in the first image and two or more blocks in the second image; and, (e) determining a first threshold value for the computed histogram intersection value that determines similarity between the block in the first image and the blocks in the second image.

12. The method as in claim 11 further comprising shifting the first image in a predetermined direction if there is not similarity between the first and second images.

13. The method as in claim 11, wherein step (a) includes dividing both of the images into three portions and using a middle portion of the three portions as the mane subject area.

14. The method as in claim 11 further comprising the step of determining a second threshold value for the computed histogram intersection value that determines similarity between the block in the first image and the blocks in the second image and consequently if the two images are near-duplicates of each other.

15. A computer storage medium having instructions stored therein for causing a computer to perform the method of claim 11.

16. A method for comparing image content of first and second images, the method comprising the steps of:

(a) dividing the first and second images into three portions and using a middle portion of the three portions as a main subject area of each image;

(b) dividing the main subject area of the images into a plurality of blocks;

(c) computing a color histogram for one block in each image;

(d) computing a histogram intersection value between the block in the first image and the block in the second image; and (e) determining a first threshold value for the computed histogram intersection value that determines similarity between the block in the first image and the block in the second image.

17. The method as in claim 16 further comprising the step of determining a second threshold value for the computed histogram intersection value that determines similarity between the block in the first image and the block in the second image and consequently if the two images are near-duplicates of each other.

18. A computer storage medium having instructions stored therein for causing a computer to perform the method of claim 16.

* * * * *